(12) United States Patent
Stacy

(10) Patent No.: US 12,091,303 B2
(45) Date of Patent: Sep. 17, 2024

(54) MOTORIZED VEHICLES HAVING SENSORS AND METHODS OF OPERATING THE SAME

(71) Applicant: Lance A. Stacy, Crown Point, IN (US)

(72) Inventor: Lance A. Stacy, Crown Point, IN (US)

( * ) Notice: Subject to any disclaimer, the term of this patent is extended or adjusted under 35 U.S.C. 154(b) by 219 days.

(21) Appl. No.: 17/326,528

(22) Filed: May 21, 2021

(65) Prior Publication Data
US 2022/0081271 A1 Mar. 17, 2022

Related U.S. Application Data

(60) Provisional application No. 63/077,781, filed on Sep. 14, 2020.

(51) Int. Cl.
*B66F 9/075* (2006.01)
*G05D 1/00* (2006.01)

(52) U.S. Cl.
CPC ........ *B66F 9/07581* (2013.01); *B66F 9/0755* (2013.01); *G05D 1/0038* (2013.01); *G05D 1/005* (2013.01)

(58) Field of Classification Search
CPC . B66F 9/07581; B66F 9/0755; G05D 1/0038; G05D 1/005; G05D 2201/0216
See application file for complete search history.

(56) References Cited

U.S. PATENT DOCUMENTS

| | | |
|---|---|---|
| 4,623,032 A | 11/1986 | Kemmer |
| 5,361,644 A | 11/1994 | Nedele et al. |
| 5,938,710 A | 8/1999 | Lanza et al. |
| 6,241,453 B1 | 6/2001 | Upmeyer |
| 6,859,697 B2 | 2/2005 | Muragishi |
| 7,688,223 B2 | 3/2010 | Magens et al. |
| 7,699,141 B2 | 4/2010 | Fossier et al. |
| 7,761,210 B2 | 7/2010 | Baginski et al. |
| 9,145,286 B2 | 9/2015 | Pfaff et al. |
| 9,828,223 B2 | 11/2017 | Svensson et al. |
| RE47,108 E | 10/2018 | Jacobus et al. |
| 10,346,797 B2 | 7/2019 | Jacobus et al. |
| 10,538,421 B2 | 1/2020 | Blevins et al. |
| 10,941,026 B2 | 3/2021 | Wirth et al. |
| 2007/0198157 A1 | 8/2007 | Righi |

(Continued)

*Primary Examiner* — Tyler J Lee
*Assistant Examiner* — Yufeng Zhang
(74) *Attorney, Agent, or Firm* — Hartman Global IP Law; Gary M. Hartman; Domenica N. S. Hartman

(57) ABSTRACT

Motorized vehicles that include a mast, a carriage supported by the mast, a hydraulic cylinder configured to raise and lower the carriage along the mast, forks or a platform coupled to the carriage and configured to support a load wherein raising and lowering the carriage raises and lowers the forks or the platform and thereby raises and lowers the load supported thereon, a system of sensors configured to gather data relating to objects in proximity to the motorized vehicle including at least two cameras configured to obtain video of at least two areas around the motorized vehicle, and one or more display screens configured to visually display the data gathered by the system of sensors or information based thereon to an operator including real-time video obtained by the cameras. Methods are provided for operating the vehicles with improved operator visibility and situational awareness relative to pre-existing vehicles.

15 Claims, 5 Drawing Sheets

(56) References Cited

U.S. PATENT DOCUMENTS

| | | | |
|---|---|---|---|
| 2008/0011554 A1* | 1/2008 | Broesel | B66F 9/0755 |
| | | | 187/224 |
| 2013/0236285 A1 | 9/2013 | Maurissen et al. | |
| 2015/0190927 A1* | 7/2015 | Sutherland | H04L 65/60 |
| | | | 901/1 |
| 2015/0225218 A1 | 8/2015 | Strand | |
| 2016/0090283 A1 | 3/2016 | Svensson et al. | |
| 2016/0180713 A1* | 6/2016 | Bernhardt | G01S 5/16 |
| | | | 701/70 |
| 2017/0036600 A1* | 2/2017 | Whitehead | B60R 1/00 |
| 2017/0212517 A1* | 7/2017 | Houle | G05D 1/0251 |
| 2017/0297879 A1 | 10/2017 | Franzen | |
| 2019/0197738 A1* | 6/2019 | Kishita | G06V 20/56 |
| 2019/0220005 A1 | 7/2019 | Flottran et al. | |
| 2019/0243353 A1 | 8/2019 | Daimer et al. | |
| 2019/0270449 A1 | 9/2019 | Grabbe et al. | |
| 2020/0039353 A1 | 2/2020 | Chandrasekar | |
| 2020/0122989 A1 | 4/2020 | Nunes Espirito Santo | |
| 2020/0133265 A1 | 4/2020 | Modolo | |
| 2020/0174479 A1 | 6/2020 | Howey | |
| 2020/0247651 A1 | 8/2020 | Wang et al. | |
| 2020/0247652 A1 | 8/2020 | Okamoto et al. | |
| 2020/0299117 A1 | 9/2020 | Sperlich et al. | |
| 2021/0035056 A1 | 2/2021 | Jacobus et al. | |
| 2021/0246004 A1* | 8/2021 | Kamiya | B66F 9/24 |
| 2022/0057797 A1* | 2/2022 | Ramsager | G05D 1/0293 |
| 2022/0126878 A1* | 4/2022 | Moustafa | B60W 50/0098 |

\* cited by examiner

MOTORIZED VEHICLES HAVING SENSORS AND METHODS OF OPERATING THE SAME

CROSS REFERENCE TO RELATED APPLICATIONS

This application claims the benefit of U.S. Provisional Application No. 63/077,781, filed Sep. 14, 2020, the contents of which are incorporated herein by reference.

BACKGROUND OF THE INVENTION

The present invention generally relates to powered industrial trucks and other powered equipment. The invention particularly relates to powered industrial trucks having a system of sensors used to improve operator visibility and awareness.

Powered industrial trucks (PITs), commonly called forklifts or lift trucks, are used in many industries, primarily to move, raise, lower, or remove large objects or a number of smaller objects on pallets or in boxes, crates, or other containers. PITs generally include a specialized motor vehicle powered by an electric motor or an internal combustion engine. FIG. 1 represents an exemplary PIT 10 that includes a mast 12, that is, a vertical assembly that supports a carriage 14. A hydraulic lift cylinder 16 is configured to raise and lower the carriage 14 along the mast 12. Forks 18 (or a platform) are coupled to the carriage 14 and are configured to support a load 20 thereon. Activation of the hydraulic lift cylinder 16 raises and lowers the carriage 14 and thereby raises and lowers the load 20 supported on the forks 18.

Many PITs have issues with poor operator visibility (i.e., blind spots), often due to the masts, components thereof, or cargo thereon blocking the operator's forward view of the truck. These blind spots may require the operator to travel with the load trailing (e.g., driving in reverse) and/or use a spotter (i.e., another individual watching and directing the operator from a nearby location) whenever necessary to achieve adequate visibility. In addition, certain PITs may include multiple mirrors positioned about the truck that are intended to provide views of various blind spots such as in front (e.g., forward) of the mast. However, these mirrors generally require the operator to observe multiple different fields of view simultaneously and rely heavily on the operator's focus and attention to avoid problems. Even with these procedures and equipment, collisions with structures and/or bystanders are common.

Therefore, it can be appreciated that it would be desirable if systems and methods were available that further improve operator visibility and situational awareness while operating PITs so as to reduce the likelihood of collisions.

BRIEF DESCRIPTION OF THE INVENTION

The present invention provides motorized vehicles having systems of sensors and methods of operation thereof suitable for improving operator visibility and situational awareness while operating the motorized vehicles and reducing the likelihood of collisions therewith.

According to one aspect of the invention, a motorized vehicle is provided that has a forward end and a rear end and is configured to travel in at least a forward direction ahead of the forward end. The motorized vehicle includes a mast having a vertical assembly, a carriage supported by the mast, a hydraulic cylinder configured to raise and lower the carriage along the mast, forks or a platform coupled to the carriage and configured to support a load thereon wherein raising and lowering the carriage raises and lowers the forks or the platform and thereby raises and lowers the load supported thereon, a system of sensors configured to gather data relating to objects in proximity to the motorized vehicle including at least two cameras configured to obtain video of at least two areas around the motorized vehicle, and one or more display screens configured to visually display the data gathered by the system of sensors or information based thereon to an operator during use of the motorized vehicle including real-time video obtained by the cameras.

According to another aspect of the invention, a method is provided for operating a motorized vehicle having a forward end and a rear end. The method includes locating a load onto forks or a platform such that the load is supported thereon wherein the forks or the platform are functionally coupled to a vertical assembly of a mast via a carriage, raising or lowering the load relative to the mast by raising or lowering the carriage with a hydraulic cylinder, gathering data relating to objects in proximity to the motorized vehicle with a system of sensors including one or more cameras, visually displaying the data gathered by the system of sensors or information based thereon to an operator of the motorized vehicle on one or more display screens viewable by the operator during use of the motorized vehicle including real-time video of at least two areas around the motorized vehicle, and traveling in the motorized vehicle in at least a forward direction ahead of the forward end while the operator observes the data or information on the one or more display screens.

Technical effects of the motorized vehicle and method described above preferably include the ability to operate motorized vehicles, such as PITs, with improved operator visibility and situational awareness.

Other aspects and advantages of this invention will be appreciated from the following detailed description.

DETAILED DESCRIPTION OF THE INVENTION

Figure 1:
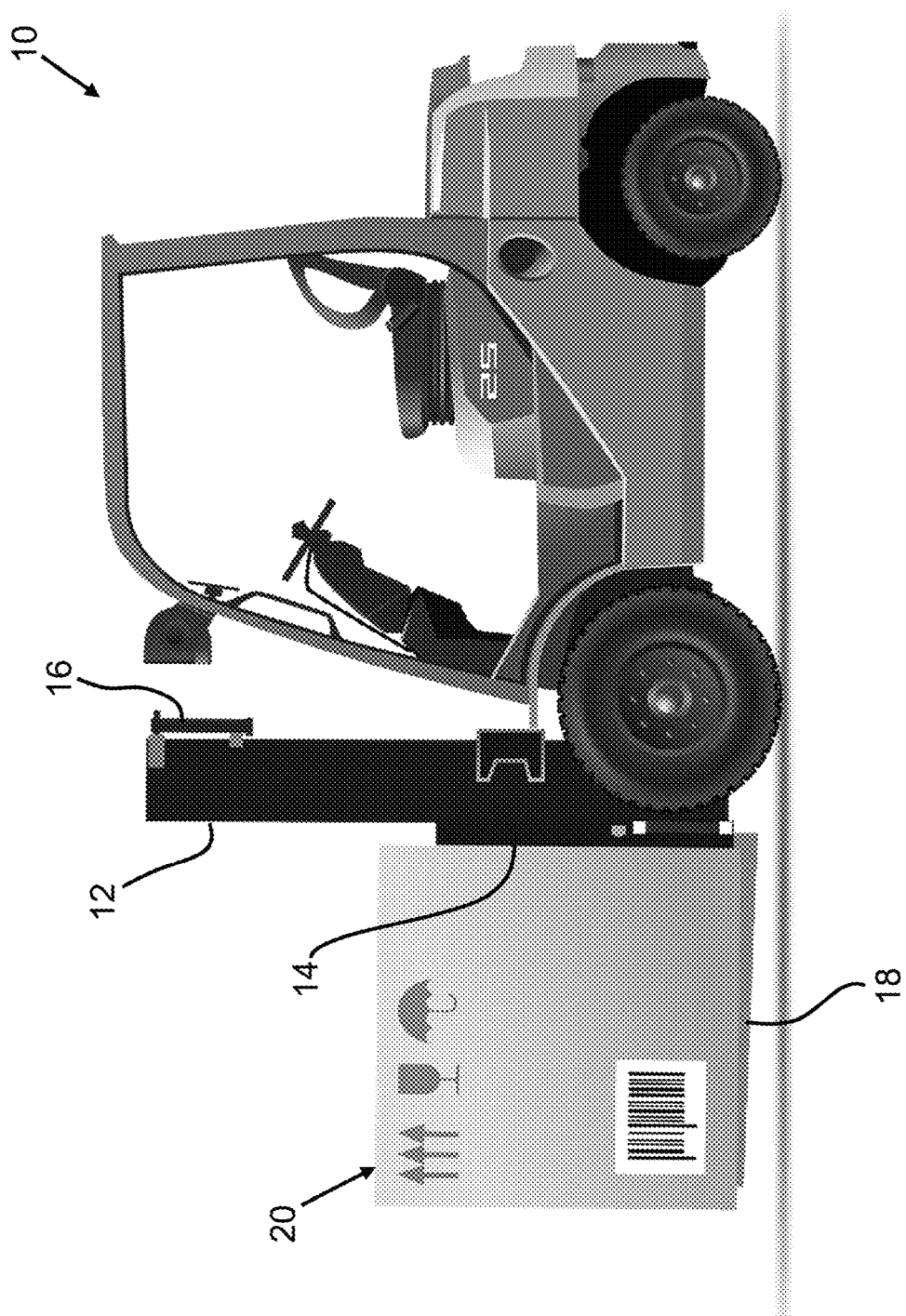
FIG. 1 represents a side view of a conventional powered industrial truck.

Disclosed herein are motorized vehicles, including but not limited to powered industrial trucks (PITs), and methods of operation thereof suitable for use in various industries and applications, such as moving, raising, lowering, or removing large objects or a number of smaller objects on pallets or in boxes, crates, or other containers. The vehicles include one or more collision reduction systems including a system of sensors configured to gather and provide data or information based by the data gathered thereby to an operator of the vehicle relating to objects in proximity of the vehicle, preferably in a manner that reduces or eliminates blind spots about the vehicle and thereby reduces the likelihood of collisions between the vehicle and the objects in proximity of the vehicle.

Although the motorized vehicles will be described hereinafter in relation to PITs, it will be appreciated that the teachings disclosed herein are applicable to various type of motorized vehicles and such vehicles are also within the scope of the invention. As used herein, PITs include but are not limited to electric motor rider trucks, electric motor narrow aisle trucks, electric motor hand trucks and hand/rider trucks, internal combustion engine trucks (solid, cushion, and pneumatic tires), electric and internal combustion engine tractors, and rough terrain forklift trucks.

To facilitate the description provided below of the embodiments represented in the drawings, relative terms, including but not limited to, "vertical," "horizontal," "lateral," "front," "rear," "side," "forward," "rearward," "upper," "lower," "above," "below," "right," "left," etc., may be used in reference to an orientation of the motorized vehicles during its operation, and therefore are relative terms that are useful to describe installations of the system of sensors represented in the drawings, but should not be necessarily interpreted as limiting the scope of the invention.

The system of sensors may include various types of sensors suitable for eliminating or reducing blind spots around the vehicle. In certain embodiments, the system may include a visual recording system that includes one or more cameras configured to capture and/or record digital video in one or more bands of the electromagnetic spectrum (e.g., visual, infrared, low light, etc.) and provides such recorded video in real-time to the operator via, for example, one or more display screens. In certain embodiments, the system may include a proximity system that includes one or more types of sensors configured to image, detect, track, and/or measure (range) distances between the vehicle and various objects around the vehicle. The sensors of such proximity system may include but are not limited to visual band spectrum cameras, radio or microwave-based sensors (e.g., RADAR), sonic/acoustic sensors (e.g., ultrasound), infrared/laser-based sensors (e.g., LIDAR), and/or magnetic field-based sensors (e.g., Hall-effect). The proximity system may include one or more means for providing measured distances to the operator in real-time, and/or may provide warnings to the operator when such measured distances are below a minimum threshold. The measured distances and/or warnings may be provided to the operator, for example, visually via one or more display screens, audibly via an audible alarm or message emitted from a speaker, or a combination thereof. In certain embodiments, the systems of sensors may visually display real-time video, real-time distance measurements, and/or other real-time information simultaneously to the operator via one or more display screens during operation of the vehicle.

Data obtained by the sensors may be provided to the operator with one or more display screens such as but not limited to one or more monitor screens, augmented reality screens or headsets, virtual reality screens or headsets, and projectors. The data may be presented as obtained by an individual sensor, may be presented as a composite of data gathered by multiple sensors (for example, multiple visual images "stitched" together), or may include a visual representation created based on data gathered by one or more sensors. In certain embodiments, the system may be configured to analyze the gathered data in order to provide relevant information to the operator based on or interpreted from the data. In such embodiments, the system may include one or more processors, data storage devices, and any other computer hardware, software, or circuitry necessary to perform such operations.

While the vehicle may include multiple display screens in multiple locations for displaying the gathered data, in certain embodiments it may be desirable to display the data on a single display screen or multiple adjacent display screens limited to a relatively condensed area such that the operator may observe all of the provided data simultaneously without the need to turn their head to observe different display screens.

The sensors may be mounted to the vehicle in various locations and directed toward various areas around the vehicle. For applications where the mast of the vehicle reduces forward visibility for the operator, one or more sensors may be directed toward one or more areas ahead of the mast and/or vehicle to improve such visibility and thereby reduce the likelihood of collisions while traveling and maneuvering with the vehicle. In certain embodiments, the sensors may provide multiple views or angles of view around the vehicle. For example, cameras may be mounted to the mast, carriage, or forks/platform and directed downward and/or upward along the mast. Such views may improve visibility and reduce the likelihood of collisions while raising and/or lowering a load. In certain embodiments, the sensors gather data relating to an area horizontally encompassing 180 degrees about the forward end of the vehicle. In other embodiments, the sensors gather data relating to an area horizontally encompassing 360 degrees about the vehicle. In other embodiments, the sensors gather data relating to area encompassing a horizontal plane about the vehicle (e.g., 180-360 degrees) and gather data encompassing one or more additional planes about the vehicle such that, for example, data is gathered about the entire height of the vehicle and along the vertical path of the forks/platform along the mast. Preferably, the system of sensors provides the operator with location and/or proximity data that reduces or eliminates the likelihood of collisions while increasing the operator's situational awareness of his total environment, either when traveling or maneuvering the vehicle and while raising and lowering the load.

Figure 2:
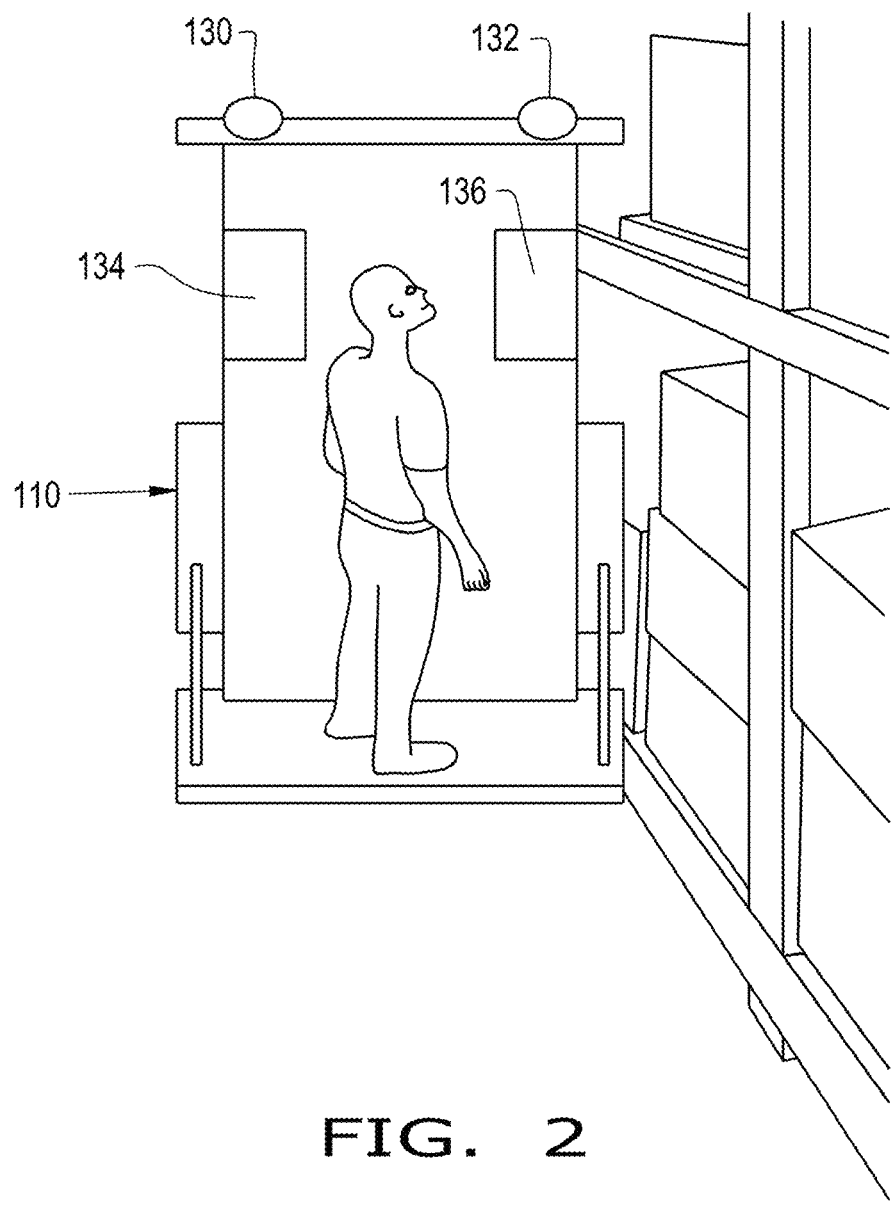
FIG. 2 represents a first nonlimiting embodiment of a powered industrial truck that includes a system of sensors and display screens for improving visibility and situational awareness about the truck in accordance with certain nonlimiting aspects of the invention.
Figure 3:
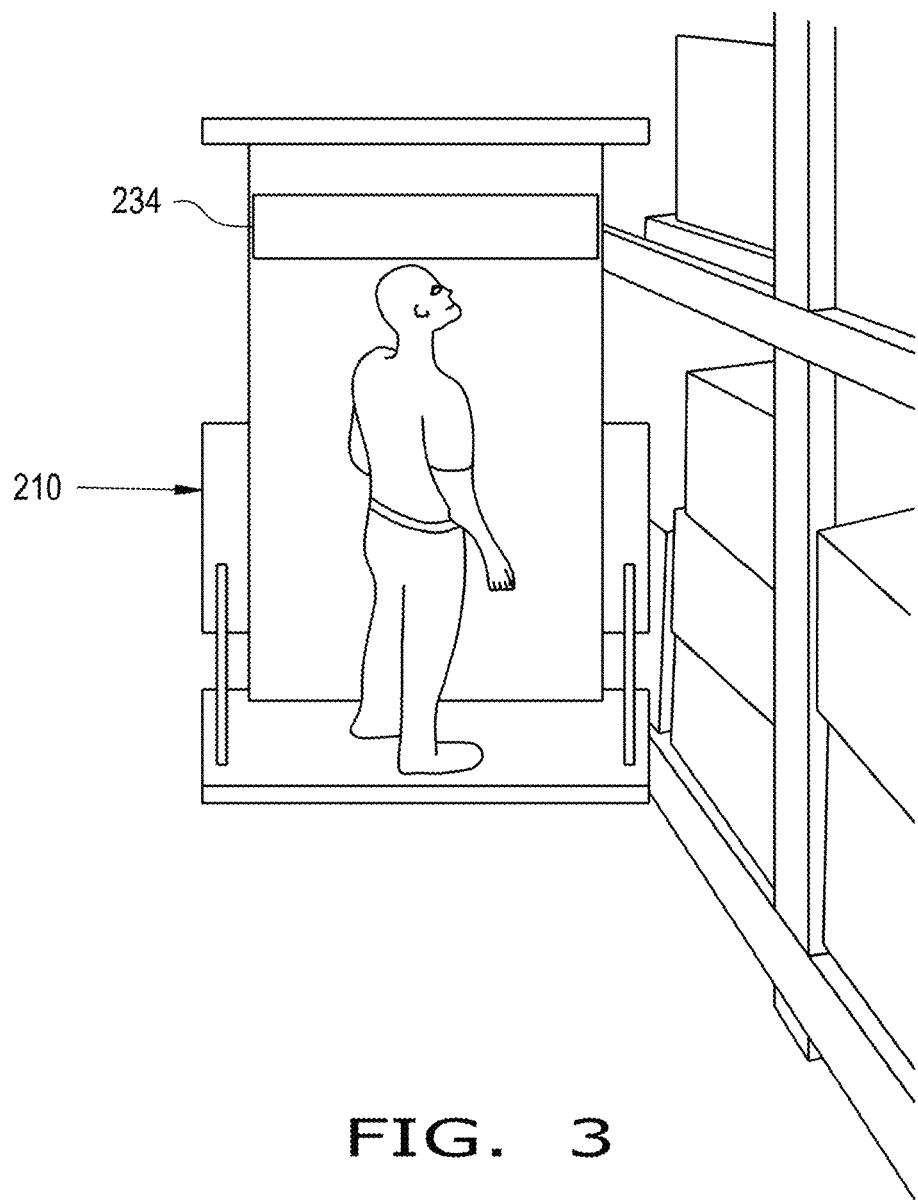
FIG. 3 represents a second nonlimiting embodiment of a powered industrial truck that includes a system of sensors and display screens for improving visibility and situational awareness about the truck in accordance with certain nonlimiting aspects of the invention.
Figure 4:
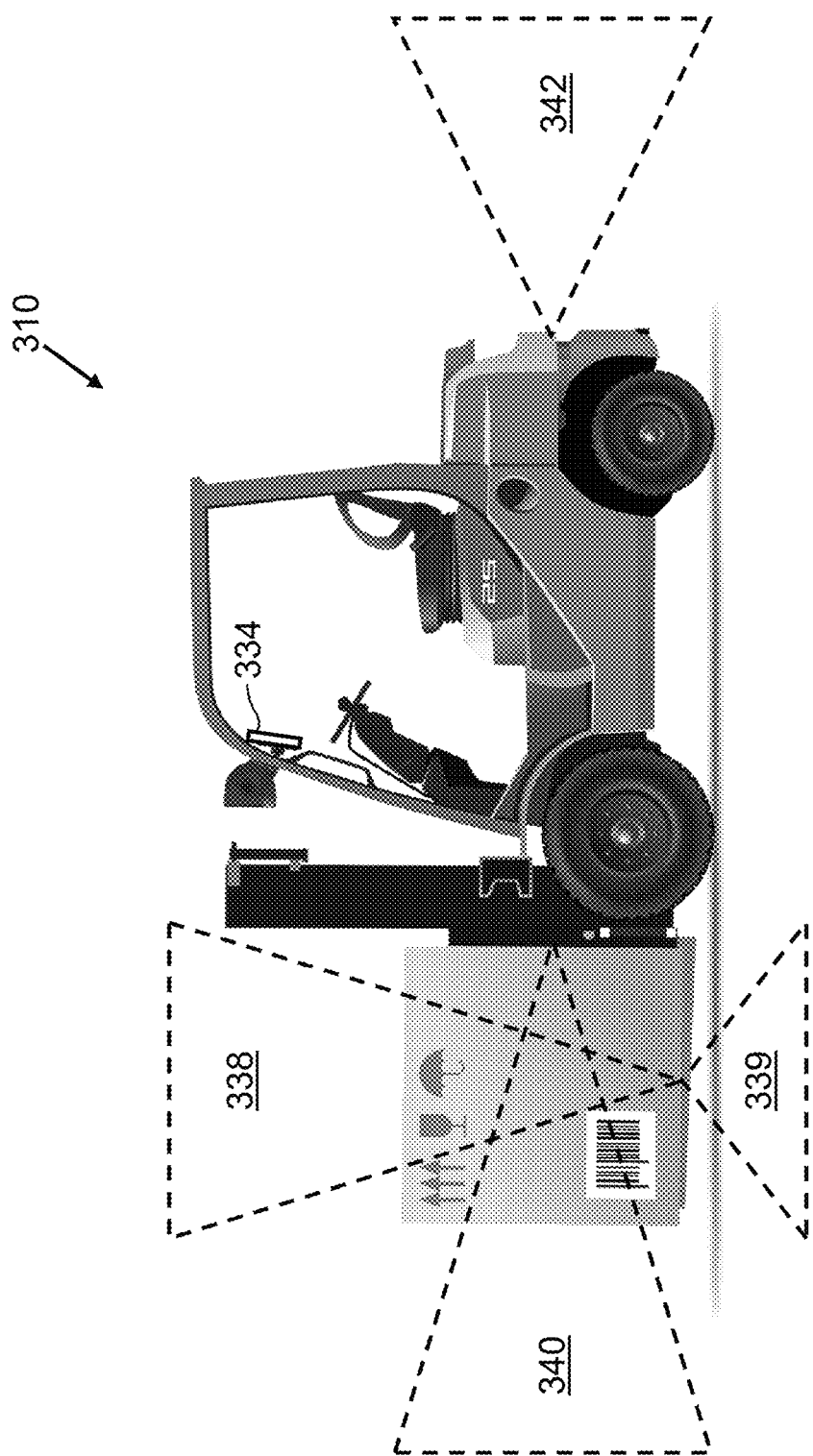
FIG. 4 represents a third nonlimiting embodiment of a powered industrial truck that includes a system of sensors and display screen(s) for improving visibility and situational awareness about the truck in accordance with certain nonlimiting aspects of the invention.
Figure 5:
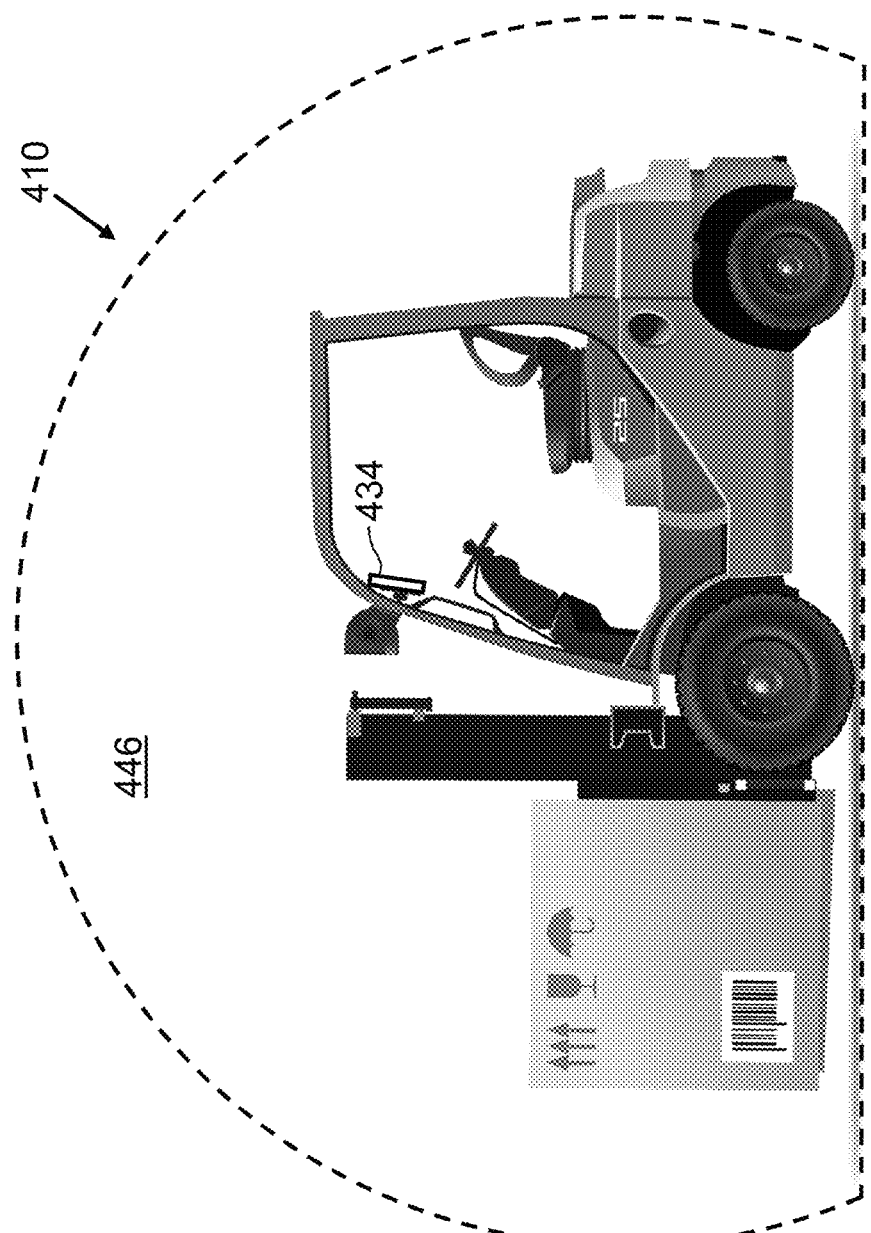
FIG. 5 represents a fourth nonlimiting embodiment of a powered industrial truck that includes a system of sensors and display screen(s) for improving visibility and situational awareness about the truck in accordance with certain nonlimiting aspects of the invention.

FIGS. 2 through 5 represent nonlimiting embodiments of PITs that include systems of sensors and display screens for improving visibility about the PITs. FIG. 2 represents a PIT 110 that includes a pair of forward-facing cameras 130 and 132, and a pair of display screens 134 and 136 configured to display data gathered by the pair of cameras 130 and 132. FIG. 3 represents a PIT 210 that includes a single elongated display screen 234 configured to display data gathered by one or more sensors (not shown). FIG. 4 represents a PIT 310 that includes multiple sensors (not shown) that gather data in vertical, forward, and rear fields of view 338, 339, 340, and 342 and at least one display screen 334 configured to display data gathered by the sensors. FIG. 5 represents a PIT 410 that includes a plurality of sensors (not shown) that in combination provide a composite field of view 446 that encompasses substantially a 360-degree sphere about the PIT 410 and at least one display screen 434 configured to display data gathered by the sensors.

In addition to displaying information to the operator, the system of sensors may be used in combination with a vehicle control system capable of taking control of the vehicle and/or operation of one or more of its components in the event of an imminent collision. For example, such a vehicle may be configured to apply emergency brakes to the vehicle's wheels, momentarily steer the vehicle away from an object, and/or cease movement of the carriage in response to detecting an object within the path of the vehicle and/or load and below a minimum threshold distance from the vehicle and/or load. Such systems may prevent or reduce the likelihood of collisions with structures and/or bystanders despite, for example, poor awareness or response time of the operator.

In addition to or as an alternative to the above, the system of sensors may be used to support one or more other systems that allow for the vehicle to be operated partially or entirely without an operator. That is, the system of sensors may be part of or work in combination with a vehicle control system that allows the vehicle to be operated autonomously with little or no human input. In such embodiments, the data obtained by the sensors may be communicated to a central processor, which processes the data to assist in making autonomous driving decisions, such as but not limited to braking, accelerating, steering changes, etc. Vehicles comprising such systems may be used for lights-out operation, that is, used in factories or other sites that are fully automated and require no human presence on-site.

In view of the above, the motorized vehicles described herein promote operation thereof with improved operator visibility and situational awareness. In certain embodiments, the vehicles are capable of movement in more than one direction simultaneously, and the system of sensors thereon can reduce the likelihood of collisions in the more than one direction simultaneously. As a nonlimiting example, an operator may be moving a PIT in a forward direction ahead of the forward end thereof while simultaneously raising or lowering a load along the mast. In this example, the system of sensors may simultaneously detect objects within the path of the vehicle as well as along the path of the load (preferably in directions above, below, and round the forks regardless of the current location of the forks along the mast), and display such objects to the operator, warn the operator, and/or take control of one or more components of the vehicle to avoid a collision. Unlike existing autonomous vehicles which are only capable of movement in a single direction at any given time, the motorized vehicles in these exemplary embodiments are capable of simultaneous movement along two or more directions and therefore receive significant benefit from the collision reduction systems disclosed herein.

In certain embodiments, even if the vehicle is not operated in multiple directions simultaneously, it will likely benefit from having sensors capable of monitoring different areas around the vehicle and the load. For example, an operator of a PIT may intend to place a load on an elevated shelf. In such embodiments, the operator may move the vehicle to a position facing the shelf, raise the load, and then move the vehicle forward to locate a base of the load over the shelf. From the operator's perspective, it may not be possible to see the area of the shelf on which the operator intends to locate the load. However, if sensors are present on the mast, carriage, forks or platform, or another location adjacent or near an upper portion of the mast, the system of sensors may be capable of monitoring the area of the shelf while simultaneously monitoring areas about the vehicle. Therefore, the system may reduce the likelihood of collisions both at ground level about the vehicle as well as at the elevated position of the shelf.

It should be understood that the general construction and operation of the motorized vehicles not discussed in detail herein can be similar or substantially the same as others known in the art. For example, it is foreseeable and within the scope of the invention that an existing motorized vehicle (e.g., the PIT 10 of FIG. 1) may be modified to include one or more of the collision reduction systems described herein to thereby promote operator visibility and situational awareness. Such modifications may include but are not limited to installation of one or more sensors, one or more display screens, one or more speakers, and one or more vehicle control systems.

While the invention has been described in terms of specific embodiments, it is apparent that other forms could be adopted by one skilled in the art. For example, the physical configuration of the motorized vehicles and their components could differ from that shown, and materials and processes/methods other than those noted could be used. In addition, the invention encompasses additional embodiments in which one or more features or aspects of different disclosed embodiments may be combined. Therefore, the scope of the invention is to be limited only by the following claims.

The invention claimed is:

1. A motorized vehicle having a forward end and a rear end and being configured to travel in at least a forward direction ahead of the forward end, the motorized vehicle comprising:

a position on the motorized vehicle for an operator controlling the motorized vehicle;

a mast having a vertical assembly between upper and lower ends of the mast, the mast reducing visibility in the forward direction and creating blind spots for the operator when at the position on the motorized vehicle;

a carriage supported by the mast and traveling along a vertical path between the upper and lower ends of the mast;

a hydraulic cylinder configured to raise and lower the carriage along the vertical path between the upper and lower ends of the mast;

forks or a platform coupled to the carriage and configured to support a load thereon, wherein raising and lowering the carriage along the vertical path raises and lowers the forks or the platform between the upper and lower ends of the mast and thereby raises and lowers the load supported thereon;

a system of sensors configured to gather data relating to objects in proximity to the motorized vehicle, wherein the system of sensors includes at least two cameras configured to obtain real-time video of at least two areas around the motorized vehicle that include the blind spots of the operator when at the position on the motorized vehicle, at least one of the at least two cameras being a forward-facing camera mounted at the upper end of the mast and above the carriage; and one or more display screen(s) configured to visually display the data gathered by the system of sensors or information based thereon, the one or more display(s) being positioned on the motorized vehicle so that the data are visibly displayed to the operator while the operator is at the position on the motorized vehicle and controlling the motorized vehicle, wherein the data or information displayed to the operator on the one or more display screen(s) includes the real-time video obtained by the at least two cameras and so as to reduce or eliminate the blind spots while the operator is at the position on the motorized vehicle and controlling the motorized vehicle;

wherein the motorized vehicle is a powered industrial truck and the data gathered by the system of sensors include first data relating to an area encompassing a horizontal plane about the motorized vehicle and second data gathered by the forward-facing camera in the forward direction from the upper end of the mast above the vertical path of the carriage and encompassing an entire height of the motorized vehicle;

wherein the data or information displayed on the one or more display screen(s) to the operator includes the second data relating to objects in the forward direction from the upper end of the mast above the vertical path of the carriage or information based thereon; and wherein the data relating to objects in proximity to the motorized vehicle include objects both above and below the forks or platform simultaneously and the data or information displayed on the one or more display screen(s) to the operator includes the data relating to the objects both above and below the forks or platform or information based thereon.

2. The motorized vehicle of claim 1, wherein the one or more display screen(s) includes a monitor screen, an augmented reality screen, a virtual reality screen, or a projector.

3. The motorized vehicle of claim 1, wherein the system of sensors includes one or more acoustic sensor(s) and the data or information displayed to the operator includes data or information based thereon obtained by the one or more acoustic sensor(s).

4. The motorized vehicle of claim 1, wherein the system of sensors includes one or more ultrasound sensor(s) and the data or information displayed to the operator includes data or information based thereon obtained by the one or more ultrasound sensor(s).

5. The motorized vehicle of claim 1, wherein the system of sensors includes one or more LIDAR sensor(s) and the data or information displayed to the operator includes data or information based thereon obtained by the one or more LIDAR sensor(s).

6. The motorized vehicle of claim 1, wherein the system of sensors includes one or more Hall-effect sensor(s) and the data or information displayed to the operator includes data or information based thereon obtained by the one or more Hall-effect sensor(s).

7. A method of operating a motorized vehicle having a forward end and a rear end and being configured to travel in at least a forward direction ahead of the forward end, the method comprising:

positioning an operator in a position on the motorized vehicle from which the operator controls the motorized vehicle;

locating a load onto forks or a platform such that the load is supported thereon, the forks or the platform being functionally coupled to a vertical assembly of a mast via a carriage between upper and lower ends of the mast, the mast reducing visibility in the forward direction and creating blind spots for the operator at the position on the motorized vehicle;

raising or lowering the load relative to the mast by raising or lowering the carriage with a hydraulic cylinder along a vertical path between the upper and lower ends of the mast;

gathering data relating to objects in proximity to the motorized vehicle with a system of sensors including one or more camera(s) that obtain real-time video of at least two areas around the motorized vehicle that include the blind spots of the operator at the position on the motorized vehicle, at least one of the one or more camera(s) being a forward-facing camera mounted at the upper end of the mast and above the carriage;

visually displaying the data gathered by the system of sensors or information based thereon to the operator at the position on the motorized vehicle, the data being visually displayed on one or more display screen(s) viewable by the operator at the position on the motorized vehicle and controlling the motorized vehicle, wherein at least some of the data or information displayed on the one or more display screen(s) includes the real-time video of the at least two areas around the motorized vehicle that include the blind spots of the operator when at the position on the motorized vehicle; and while the operator is at the position on the motorized vehicle, the operator controlling the motorized vehicle to travel in at least the forward direction ahead of the forward end while the operator observes the data or information on the one or more display screen(s), the real-time video reducing or eliminating the blind spots of the operator;

wherein the motorized vehicle is a powered industrial truck and the data gathered by the system of sensors include first data relating to an area encompassing a horizontal plane about the motorized vehicle and second data gathered by the forward-facing camera in the forward direction from the upper end of the mast above the vertical path of the carriage and encompassing an entire height of the motorized vehicle;

wherein the data or information displayed to the operator includes the second data relating to objects in the forward direction from the upper end of the mast above the vertical path of the carriage or information based thereon; and wherein the data relating to objects in proximity to the motorized vehicle include objects both above and below the forks or platform simultaneously and the data or information displayed to the operator includes the data relating to the objects both above and below the forks or platform or information based thereon.

8. The method of claim 7, further comprising a monitor screen, an augmented reality screen, a virtual reality screen, or a projector, the method including displaying the data or information on the augmented reality screen, the virtual reality screen, or the projector.

9. The method of claim 7, wherein at least some of the data gathered by the system of sensors is obtained with one or more acoustic sensor(s) and at least some of the data or information displayed on the one or more display screen(s) includes the data gathered by the one or more acoustic sensor(s) or information based thereon.

10. The method of claim 7, wherein at least some of the data gathered by the system of sensors is obtained with one or more ultrasound sensor(s) and at least some of the data or information displayed on the one or more display screen(s) includes the data gathered by the one or more ultrasound sensor(s) or information based thereon.

11. The method of claim 7, wherein at least some of the data gathered by the system of sensors is obtained with one or more LIDAR sensor(s) and at least some of the data or information displayed on the one or more display screen(s) includes the data gathered by the one or more LIDAR sensor(s) or information based thereon.

12. The method of claim 7, wherein at least some of the data gathered by the system of sensors is obtained with one or more Hall-effect sensor(s) and at least some of the data or information displayed on the one or more display screen(s) includes the data gathered by the one or more Hall-effect sensor(s) or information based thereon.

13. The method of claim 7, further comprising simultaneously visually displaying the real-time video of the at least two areas around the motorized vehicle obtained with the at least two cameras of the system of sensors on a single display screen.

14. The motorized vehicle of claim 1, the motorized vehicle further comprising a vehicle control system configured to take control of the motorized vehicle and/or the carriage from the operator in the event of an imminent collision.

15. The method of claim 7, wherein the motorized vehicle comprises a vehicle control system, the method further comprising the vehicle control system taking control of the motorized vehicle and/or the carriage from the operator in the event of an imminent collision.

* * * * *